United States Patent [19]
Jalan, deceased et al.

[11] Patent Number: 5,306,476
[45] Date of Patent: Apr. 26, 1994

[54] CONTINUOUS SULFUR REMOVAL PROCESS

[75] Inventors: Vinod Jalan, deceased, late of Concord, Mass., by Radha Jalan, executrix; Jae Ryu, Cambridge, Mass.

[73] Assignee: Electrochem, Inc., Woburn, Mass.

[21] Appl. No.: 892,556

[22] Filed: Jun. 2, 1992

[51] Int. Cl.$^5$ .............................................. C01B 17/16
[52] U.S. Cl. ................................... 423/220; 423/224; 423/564; 423/573.1; 95/45; 95/136; 96/11
[58] Field of Search ............ 423/220, 224, 564, 573.1, 423/225; 55/16, 158, 73; 95/45, 136; 96/11

[56] References Cited
U.S. PATENT DOCUMENTS
4,722,799  2/1988  Ashbrook et al. ................... 210/722

FOREIGN PATENT DOCUMENTS
61-35821   2/1986  Japan ....................................... 55/73
2-107313   4/1990  Japan ....................................... 55/73
2-303515  12/1990  Japan ....................................... 55/73

*Primary Examiner*—Gary P. Straub
*Assistant Examiner*—Timothy C. Vanoy
*Attorney, Agent, or Firm*—Bruce F. Jacobs

[57] ABSTRACT

A continuous process for the removal of hydrogen sulfide from a gas stream using a membrane comprising a metal oxide deposited on a porous support is disclosed.

14 Claims, 1 Drawing Sheet

CONTINUOUS SULFUR REMOVAL PROCESS

U.S. GOVERNMENT RIGHTS

This invention was made with U.S. Government support under Contract No. DE-FG-b 02-91ER81182 awarded by the Department of Energy. The Government has certain rights in this invention.

BACKGROUND OF THE INVENTION

The current state of U.S. dependence on foreign oil reserves for much of its energy needs is undesirable in light of the possibility of recurring supply and price disruptions. Accordingly, the Federal Government and the DOE, in particular, have been promoting the development of domestic energy sources, including the abundant supply of inexpensive coal and natural gas. Recent efforts in advanced coal-based technology have focused in part on the use of coal gas as a potentially more efficient and economical alternative to pulverized solid coal. However, the presence of significant quantities of contaminants such as particulates, alkalis, and sulfur compounds presents a serious problem. Sulfur is of particular concern in that it may promote the corrosion of power generation equipment, is a poison to catalysts in fuel cell power plants and gas liquefaction, and is a principal source of air pollution and acid rain. For these same reasons, sulfur is also a problem when present in other gas streams used in energy production such as natural gas.

Since bulk energy production is a highly price driven industry, technologies like polymer membranes and aqueous scrubbers which require cooling of the gasification product streams prior to treatment incur a heavy penalty and are not economically feasible. The current state-of-the-art in high temperature, high pressure desulfurization involves the use of chemical sorbent beds. The materials, generally supported or unsupported metal oxide pallets, remove sulfur from the gas by a chemical reaction of the type:

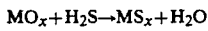

$$MO_x + H_2S \rightarrow MS_x + H_2O$$

wherein M is a metal reactive with S. A number of such systems have been studied extensively and demonstrated a high degree of effectiveness. However, as the capacity of the sorbent is approached, its effectiveness drops, and it must be removed from service, making it a batch process with all the associated restrictions and engineering complexities thereof.

Because the metal-sulfur reaction is stoichiometric, large quantities of bulky sorbent must be used. Moreover, although some sorbents may be regenerated by means of highly exothermic reactions using an oxidant, even the regenerable sorbents must be replaced after a number of cycles, thereby introducing replacement costs and the more and more vexing problem of large scale solid chemical waste disposal.

Membrane separation can offer increased flexibility of design, continuous operation, and lower cost, and is rapidly replacing other technologies in many applications. Membranes currently being studied for hot coal gas separations are porous ceramics that can withstand high temperatures and pressures in corrosive chemical environments. See, for example, "Gas Separation Using Inorganic Membranes", Egan et al, *Proceedings of the Tenth Annual Gasification and Gas Stream Clean-up System Contractors Review Meeting*, Morgantown, W.V. (August, 1990). Since the size of the pores of the ceramic membranes are generally larger than about 40 angstroms, the dominant mechanism of separation must be Knudsen diffusion under the driving force of the differential pressure between the two sides of the membrane. In Knudsen diffusion, hydrogen can permeate through the membrane up to about 4.12 times faster than hydrogen sulfide. Accordingly, the permeate stream is enriched in hydrogen while most of the contaminates stay in the retentate stream. Although the degree of separation may be improved by staging, a significant quantity of fuel will always be lost to the retentate stream. Furthermore, the low pressure hydrogen-enriched permeate must be repressurized after each stage. For these reasons, current passive membrane systems are not presently economically competitive with sorbent-based processes for the removal of $H_2S$ from gas streams.

It is an object of the present invention to develop a continuous process for the removal of sulfur from gas streams in an economical fashion.

SUMMARY OF THE INVENTION

Accordingly, the present invention is directed to a continuous process for the removal of hydrogen sulfide, $H_2S$, from gas streams containing the same. The invention entails contacting an $H_2S$-containing gas stream with a membrane comprising an impervious layer of reactive metal oxide deposited on an inert porous support, such as a ceramic, and concurrently therewith contacting the membrane with an oxidant. Sulfur, as hydrogen sulfide, is removed from the fuel side of the membrane by reaction with the metal oxide and liberated on the oxidant side of the membrane as elemental sulfur or $SO_2$. With an appropriate selection of the metal oxide which is the reactive component and providing a suitably oxidizing atmosphere on the desulfurization side of the membrane, the overall reaction produces elemental sulfur or $SO_2$ which can then be recovered using a sulfur recovery unit such as a condenser.

Suitable metal oxides are those which are thermodynamically suitable to reduce the $H_2S$ level of feed gas stream to less than about 40 ppm. Such a metal oxide should also be one that can be regenerated with $SO_2$ to yield elemental sulfur. A suitable oxidizing atmosphere is one that comprises $SO_2$-containing air or oxygen. The concentration of the $SO_2$ in the oxidant atmosphere is determined by the concentration of $H_2S$ in the feed stream which is generally about half of the $H_2S$ concentration. The gas after passing through the membrane (depending upon the reaction species, the space velocity, and flow rates) is a substantially $H_2S$ free gas; i.e., with an $H_2S$ concentration of below about 40 ppm and preferably below about 1 ppm.

DETAILED DESCRIPTION OF THE INVENTION

Figure 1:
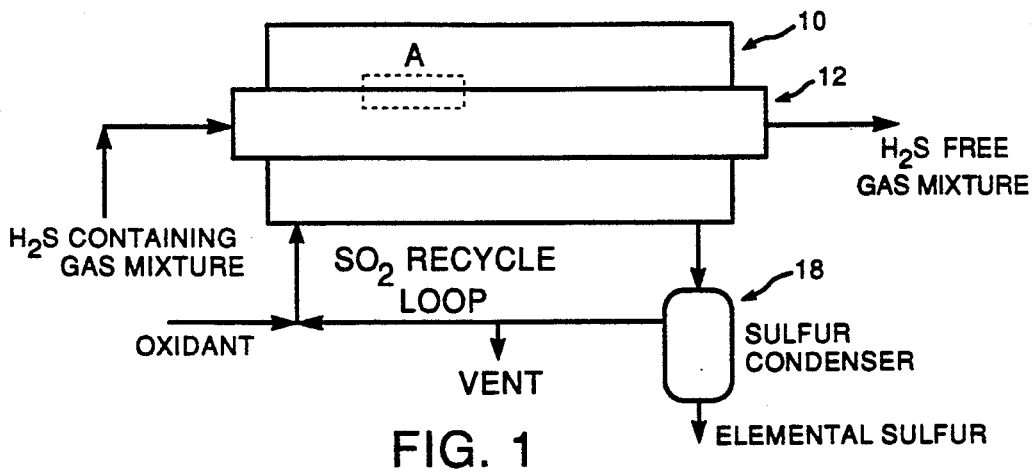
FIG. 1 is a schematic view of the process of the present invention.

Referring to the drawings, FIG. 1 shows a general process scheme for the present invention. As shown, an $H_2S$-containing gas mixture enters the reactor 10 which is of a cylindrical configuration in this embodiment, at a high temperature and pressure. The temperature and pressure within the reactor generally range from about 400° to 1,000° C. and from about 0 to 3,000 psig, respectively. More preferably, the temperature of the gas within the reactor is of from about 445° C., which is about the boiling point of sulfur, to about 750° C. The preferred maximum temperature also corresponds to about the melting point or decomposition temperature of the metal sulfides produced in the gas stream in the reactor.

Figure 2A:
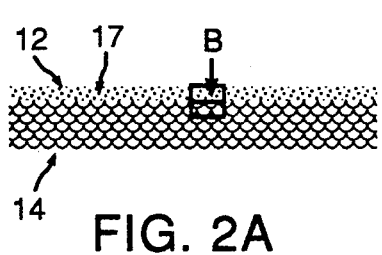
FIG. 2A is a sectional view of a portion of the membrane of FIG. 1.
Figure 2B:
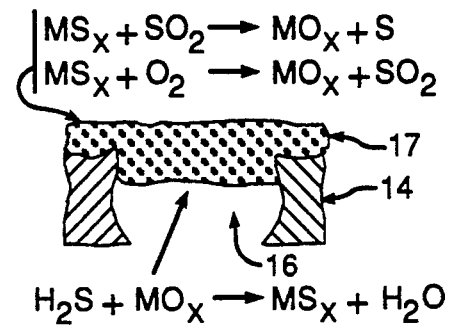
FIG. 2B is a sectional view of a portion of the membrane of FIG. 2A.

The gas enters one side of the membrane, which is preferably cylindrical, and which is shown in part in an exploded view in FIGS. 2A and 2B. FIG. 2A shows the inset labeled A in FIG. 1. FIG. 2B shows the inset in FIG. 2A labeled inset B. The $H_2S$ containing gas i) diffuses through the porous ceramic support 14 having pores 16 and (ii) reacts with a reactive metal oxide 17 according to the following general reaction:

$$H_2S + MO_x \rightarrow MS_x + H_2O$$

wherein M is any suitable metal as described previously such as copper, zinc, iron, manganese, vanadium, calcium, barium, strontium and mixtures thereof and x is 1 to 3.

An oxidant such as air, $O_2$, $SO_2$, or a mixture of two or more of such gases contacts the membrane 12 from the opposite oxide side as is best shown in FIG. 2B traveling through pores 16. Initially, the $MS_x$, which is produced in-situ, oxidizes to $MO_x$ and $SO_2$ according to the following reaction:

$$MS_x + O_2 \rightarrow MO_x + SO_2$$

and then the $SO_2$ reacts with the MS according to the following reaction:

$$MS_x + O_2 \rightarrow MO_x + S$$

The net reaction is;

$$H_2S + \tfrac{1}{2}O_2 \rightarrow H_2O + S$$

The sulfur produced in this series of reactions is removed from the oxidant containing gas stream and then passed through a suitable sulfur removing device 18 such as a sulfur condenser to produce elemental sulfur. $SO_2$, which is also taken off with the sulfur, is preferably recycled as shown in FIG. 1 and combined with the oxidant feed. The process is continuous since by continually passing the oxidant over the reactive layer of the membrane the metal oxide is continuously regenerated, thus dispensing with any need for replacement of the metal oxide and/or the entire membrane.

The determination of the amount of gas that can be treated, amount of oxidant needed, and the dimensions and composition of the membrane is a function of the relative rates of diffusion and chemical reactions within the membrane. In the process of the present invention, gaseous species enter the metal oxide film layer by reaction only, then the film layer becomes permselective for the particular species that reacts and reaction kinetics.

There are two limiting cases: reaction control and diffusion control where the intrinsic kinetics of one or the other process, being substantially slower, determines the overall rate of transport. The physically adjustable parameters that will determine whether diffusion or reaction controls the process is the metal oxide film thickness, L, and the temperature and pressure of the incoming $H_2S$ containing gas stream. This is because the diffusional flux is of the order $D_1C_1/L$, while the surface reaction rate in comparable dimensions is $kC_1C_2$; wherein D is diffusivity of the sulfur, C is concentration of the reactant and k is a second order surface reaction constant equal, and subscripts 1 and 2 denote solid phase MO and gas phase $H_2S$, respectively.

Using these equations, an analysis for any particular set of parameters can be carried out as described hereinafter. For example, for a process operating at 700° C., 1000 psi, with 1% $H_2S$ in coal gas using manganese oxide as the metal oxide reactive layer of the membrane and assuming an average MO and MS effective concentration 60 mg mol/cm$^3$, the following calculations can be made. The effective concentrations of manganese oxide and manganese sulfide are 76 and 46 mg mol/cm$^3$, respectively. Thus, the average, used below, is about 60 mg ml/cm$^3$.

1) Diffusion-limited flux = $D_1C_1/L$
   L = 1000 angstroms = $10^{-5}$ cm,
   D = $10^{-8}$ cm$^2$/sec,
   $C_1$ = 60 mg-molcm$^3$
   Therefore, the diffusion-limited flux would be $6 \times 10^{-5}$ g mol of $H_2S$ per cm$^2$-sec.

2) Reaction-limited flux = $kC_1 \times C_2$
   k = $2.1 \times 10^{-2}$ cm$^4$/min mg mol,
   $C_1$ = 60 mg-mol/cm$^3$
   $C_2$ = $8.5 \times 10^{-6}$ g. mol/cm$^3$ (ideal gas)
   Therefore, the reaction-limited flux would be $1.79 \times 10^{-7}$ g mol/cm$^2$-sec.

Based on this analysis, the reaction-limited flux is 335 times slower than the diffusion flux. Therefore the reaction, not the diffusion, is controlling and the $H_2S$ flux is $1.7 \times 10^{-7}$ g mol/cm$^2$- sec. This means that for a 1% $H_2S$ gas stream $1.7 \times 10^{-5}$ g mol/cm$^2$-sec of gas mixture can be treated. The calculated value of the $H_2S$ flux, $1.7 \times 10^{-7}$ g mol/cm$^2$-sec, is the $H_2S$ removal capacity in the membrane-based process of the present invention at the given process conditions. Since it has been assumed that the feed gas stream contains 1% $H_2S$, the total amount of gas which can be treated (which contains 1% of $H_2S$) is $100 \times (1.7 \times 10^{-7}) = 1.7 \times 10^{-5}$ g mol per sec and per cm$^2$ area of membrane.

Furthermore, in a membrane module which contains two or more stacked membranes having a thickness of 80 mils (as 0.2 cm), there is a membrane volume of 0.2 cm$^3$/cm$^2$ surface. As described above, it is known that $1.7 \times 10^{-5}$ g mol/cm$^2$-sec of gas stream containing 1% of $H_2S$ can be treated using the membrane-base process. This amount of gas $1.7 \times 10^{-5}$ g mol/cm$^2$-sec is equal to $6.12 \times 10^{-2}$ g mol/cm$^2$-hr (simply multiply by 3600 to convert sec to hr). Now, since the thickness of the membrane is 0.2 cm, there can be 5 membranes in a 1 cm thick module. Therefore, by using a unit volume of membrane module or reactor (1 cm$^3$), $5 \times (6.12 \times 10^{-2}) = 0.306$ g mol/hr.-cm$^3$ of gas can be treated. Typical molecular weight of medium Btu fuel gas is about 22 gm/mole, therefore, 6.732 gm of gas/hr.-cm$^3$ (= 0.36 × 22) can be treated.

For a 110 MWe size power plant, about 3100 lb/hr. medium Btu gas is necessary; therefore, $2.086 \times 10^5$ cm$^3$ volume of membrane module is required. If three stages of membrane modules are required for removal of $H_2S$ down to ppm level, the total volume of membrane module will be $6.258 \times 10^5 cm^3$. If it is assumed that the density of metal oxide and substrate is about 5.4 gm/cm$^3$, then $3.38 \times 10^5$ gm (about 7,500 lb) of metal oxides is required for a 110 MWe power plant.

The membrane 12 employed in the process comprises an impervious layer of reactive metal oxide deposited on an inner porous support. The membrane may be a single membrane or in the form of a module comprising two or more membranes stacked together. As previously discussed, the reactive metal oxide may be selected from oxides of metals such as copper, zinc, iron, manganese, vanadium, calcium, barium, strontium, and mixtures thereof. The selection of the metal oxide will depend on the temperature and pressure of the gas stream being treated and particularly the temperature. The temperature can range from about 400° C. to 1,000° C. ZnO is suitable at temperatures of about 450° C. while $FeO_x$ is suitable at temperatures ranging from about 400° to 550° C. $CuMnO_x$ and $ZnFeO_x$ are suitable at temperatures of about 700° C. and (Sr, Ca) BaO are particularly suitable at high temperatures of about 1,000° C. The support layer for the membrane is preferably ceramic and may be selected from any of alumina, zirconia, titania, and silica.

Figure 3:
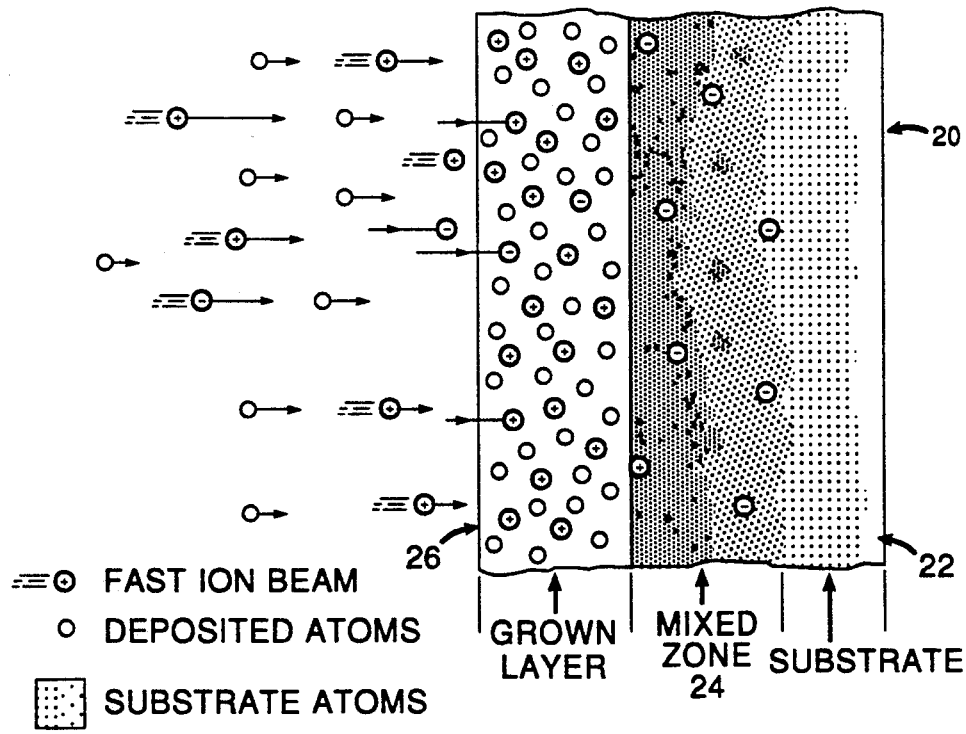
FIG. 3 is a cross-sectional view of a portion of the membrane of the present invention.

The membrane is generally prepared using a suitable thin film deposition technique such as ion beam enhanced deposition, metal organic chemical vapor deposition, spray coating, slurry coating, and the like. It is, however, presently preferred to employ ion beam processing. The thin film produced by such techniques generally range from about 0.1–10 microns. According to this technique, a component species of materials to be deposited is introduced into a sample chamber from an electron beam evaporation source or by sputtering while the substrate is simultaneously bombarded with a remotely generated ion beam. The deposition parameters which can thus be controlled independently include chamber pressure, deposition rate, gas species, ion flux (current), ion energy, angle of incidence, and ion species. The ion beam may be used to modify the physical characteristics of the material being deposited or may itself be incorporated into the layer in stoichiometric proportion. For example, metal oxide evaporated into the sample chamber can be bombarded with a relatively non-reactive ion like $Ar^+$ or a compatible ion like $O^-$ in low dosages; alternatively, a metal oxide layer could be formed by treating a vapor of the pure metal with a stoichiometric dosage of $O^-$ ions. A membrane produced according to such process is shown in FIG. 3 wherein the membrane 20 comprises a support layer 22 a mix zone 24 and a reactive metal oxide layer 26.

Ion bombardment has been shown to dramatically increase the number of nucleation cites in early film formation as well as causing a reduction in both grain size and defect density. Significant manifestations of these effects are the higher density and reduced porosity observed in films produced by such process in direct contrast to the column-like structure with macroscopic voids or channels typical of evaporated films. Another benefit is the generally superior adhesion, due to a combination of surface cleaning and interfacial mixing caused by the energetic incident ions. In addition, intrinsic films stress can be tailored to eliminate thermal expansion mismatch with a substrate by systematically controlling the amount of energy delivered per atom of condensable species.

The membranes of this invention will be shaped and formed into the geometry required to fit a particular reactor configuration. For example, typical reaction configurations include (1) cylindrical, as in Alcoa's Membralox or Westinghouse's solid oxide fuel cells, (2) monolithic as in Argonne National Laboratory's solid oxide fuel cell or (3) planar plate and frame type as in a phosphoric acid fuel cell or a molten carbonate fuel cell or crossflow filtration units.

In the membrane separation process of this invention, the size of the membrane module is linearly related to the amount of gas to be treated. The amount of reactive metal oxide (0.1–10 micron thickness) is negligible compared to that of the substrate which range in thickness from about 100 to 3000 microns and more preferably about 2 mm in thickness.

EXAMPLES

A. Preparation of Composite Membranes

Thin films were deposited on commercially available alumina and zirconia ceramic substrates. All these materials were disc shaped and one inch in diameter. ZnO and $Fe_2O_3$ were chosen as the reactive metal oxide films because both have shown good reaction kinetics, are stable in the temperature range of interest and can be regenerated with $SO_2$ to yield elemental sulfur.

Ion beam enhanced (or assisted) electron beam evaporation (generally referred as IBED) technique was employed to deposit iron oxide thin films. Since zinc is rather volatile and it contaminates high vacuum instrumentation, each run for the zinc oxide deposition by IBED required a careful cleaning of the deposition system. Zinc oxide deposition, therefore, was carried out by a conventional sol-gel technique.

Eleven sets of $FeO_x$ films and fifteen sets of $ZnO_x$ films were prepared on various microporous substrates. In each set, at least three samples were prepared for permeation measurements, structural characterization, and duplicate samples for confirmation testing.

The thin film/substrate composites were first inspected visually. The presence of any macroscopic defects, such as cracks, was carefully investigated. All samples were first subjected to permeation testing at room temperature using a membrane holder with a Viton O-ring seal. For this measurement, $N_2$, He, or simulated coal gas was used. Selected samples were further tested at temperature in the membrane holder/desulfurization reaction cell. For the high temperature tests, a unique sealing technique using thin graphite foil with an inorganic coating was employed. This sealing technique was effective for all gas atmospheres including hydrogen sulfide, oxygen, and inert gases.

Cross-section and surface scanning electron microscopy (SEM) were used to determine the morphology of the film and to detect any microscopic structural defects and changes in membrane structure after exposure to high temperatures and coal gas atmospheres. Selected samples were further analyzed, especially after exposure to $H_2S$, using EDS to determine the distribution of sulfur in the film and the presence of any impurity phases.

B. Testing

Composite membranes with either 5 m iron oxide or 10 m zinc oxide films on alumina substrates were subjected to a set of experiments to establish proof of the proposed concept. The high temperature permeation test reactor with coated graphite foil seals was used in these tests. The results of this experiment showed that, at 500°-750° C., both composite films were impervious to He, $N_2$, and $H_2S$. With $H_2S$-containing coal gas as the feed and air as oxidant containing gas, they provided reactive transfer of sulfur with sulfur dioxide production. Furthermore, with $H_2S$-containing coal gas as the feed and $N_2 + SO_2$ as oxidant containing gas, they provided reactive transfer of sulfur with elemental sulfur production. In both the cases, semiquantitative sulfur balances were obtained by monitoring $H_2S$ and $SO_2$ levels in both inlets and outlets and the amount of elemental sulfur condensation. The rate of disappearance of $H_2S$ confirmed sulfur transfer rates of about $1 \times 10^{-7}$ g mol/cm$^2$-sec, similar to that used in our calculations.

In conclusion, the production of impervious films of reactive $FeO_x$ and ZnO on microporous substrates using ion beam enhanced deposition and sol-gel processing was accomplished. The film/substrate composites were physically and chemically stable at high temperatures in $H_2S$-containing gas atmospheres. Most importantly, these films were impervious or exhibited negligible permeability, but they exhibited reactive transport of sulfur.

In the membrane separation process according to the invention, the size of the membrane module is linearly related to the amount of gas to be treated. The amount of reactive metal oxide (0.1-10 micron thickness) is negligible compared to that of the substrate which ranges in thickness from about 100 to 3000 microns and more preferably is about 2 mm in thickness.

What is claimed is:

1. In a process for the removal of hydrogen sulfide from a pressurized hydrogen sulfide containing gas stream, the improvement comprising:
   A) providing a membrane comprising a gas impervious metal oxide that reacts with the hydrogen sulfide as a first side and a porous substrate upon which sulfur is deposited as the opposite side;
   B) passing a pressurized hydrogen sulfide containing gas along the porous substrate side of the membrane and concurrently passing an oxidant containing gas along the metal oxide side of the membrane;
   C) reacting the hydrogen sulfide and metal oxide to form metal sulfide and water;
   D) oxidizing the metal sulfide with the oxidant to form sulfur and metal oxide, and
   E) removing the sulfur formed.

2. The process of claim 1, wherein sulfur dioxide is co-produced with sulfur, said sulfur dioxide is recycled by adding it to the oxidant containing gas.

3. The process of claim 1, wherein the hydrogen sulfide containing gas stream is a coal gas stream.

4. The process of claim 1, wherein the hydrogen sulfide containing gas stream is a natural gas stream.

5. The process of claim 1, wherein the metal oxide is one which is capable of reducing the $H_2S$ level of the gas stream to below about 40 ppm.

6. The process of claim 1, wherein the metal oxide is selected from the group containing of the oxides of copper, zinc, iron, manganese, vanadium, calcium, barium, strontium, and mixtures thereof.

7. The process of claim 1, wherein the porous substrate is a ceramic substrate selected from the group consisting of alumina, zirconia, titania, and silica.

8. The process of claim 1, wherein the thickness of the metal oxide is from about 1000 Angstroms to 10 microns and the thickness of the porous substrate is from about 100 to 3,000 microns.

9. The process of claim 1, wherein the hydrogen sulfide containing gas stream is at a temperature of from about 400° to 1,000° C. and a pressure below 3,000 psig.

10. The process of claim 1, wherein the membrane is a module comprising two or more individual membranes.

11. The process of claim 1, wherein the membrane is of a planar configuration.

12. The process of claim 1, wherein the membrane is of a monolithic configuration.

13. The process of claim 12, wherein the monolithic membrane has a cylindrical configuration.

14. The process of claim 1, wherein the membrane is formed by ion beam enhanced deposition of the metal oxide onto the substrate.

* * * * *